United States Patent [19]

Graf

[11] Patent Number: 4,810,478

[45] Date of Patent: Mar. 7, 1989

[54] PROCESS OF REMOVING POLLUTANTS FROM FLUE GAS

[75] Inventor: Rolf Graf, Friedrichsdorf, Fed. Rep. of Germany

[73] Assignee: Metallgesellschaft Aktiengesellschaft, Frankfurt am Main, Fed. Rep. of Germany

[21] Appl. No.: 29,389

[22] Filed: Mar. 23, 1987

Related U.S. Application Data

[63] Continuation of Ser. No. 886,805, Jul. 16, 1986, abandoned.

[30] Foreign Application Priority Data

Jul. 20, 1985 [DE] Fed. Rep. of Germany ....... 3526008

[51] Int. Cl.$^4$ .......................... B01J 8/00; C01B 17/00
[52] U.S. Cl. ...................................... 423/244; 423/242
[58] Field of Search .......... 423/242 A, 244 R, 244 A, 423/239, 239 A, 235, 235 D

[56] References Cited

U.S. PATENT DOCUMENTS

| | | | |
|---|---|---|---|
| 4,081,513 | 3/1978 | Moss | 423/242 |
| 4,495,163 | 1/1985 | Nguyen | 423/244 |
| 4,548,797 | 10/1985 | Sauer et al. | 423/240 |
| 4,670,237 | 6/1987 | Graf et al. | 423/244 |

FOREIGN PATENT DOCUMENTS

| | | |
|---|---|---|
| 1217033 | 1/1987 | Canada . |
| 3235558 | 3/1984 | Fed. Rep. of Germany ...... 423/244 |
| 3235559 | 5/1984 | Fed. Rep. of Germany . |

Primary Examiner—Gregory A. Heller
Attorney, Agent, or Firm—Felfe & Lynch

[57] ABSTRACT

Disclosed is a process for removing sulfur oxides and optionally other gaseous pollutants from flue gases by means of a reactant which is contained in a circulating fluidized bed and contains sodium, potassium, calcium and/or magnesium as a cation and oxide, hydroxide and/or carbonate as an anion. The adaptation to all operating conditions of the plants by which the flue gas is supplied is simplified in that pollutants are removed from the flue gases when the temperature of the mixture of flue gas and reactant is not in excess of 50° C. above the dew point temperature of water vapor. The reactant is selectively charged at different locations in a dry form, on the one hand, and as an aqueous solution or suspension, on the other hand, the form in which the reactant is charged being controlled in dependence of the temperature and the $SO_2$ content of the purified gas. If the reactant is charged in a liquid phase it has suitably a solids content of 5 to 30 wt. %, the temperature of the mixture of flue gas and reactant is maintained between 3° and 30° C. above the dew point temperature of water vapor and the means suspension density in the fludized bed reactor is maintained between 0.2 and 2 kg/m$^3$.

8 Claims, 1 Drawing Sheet

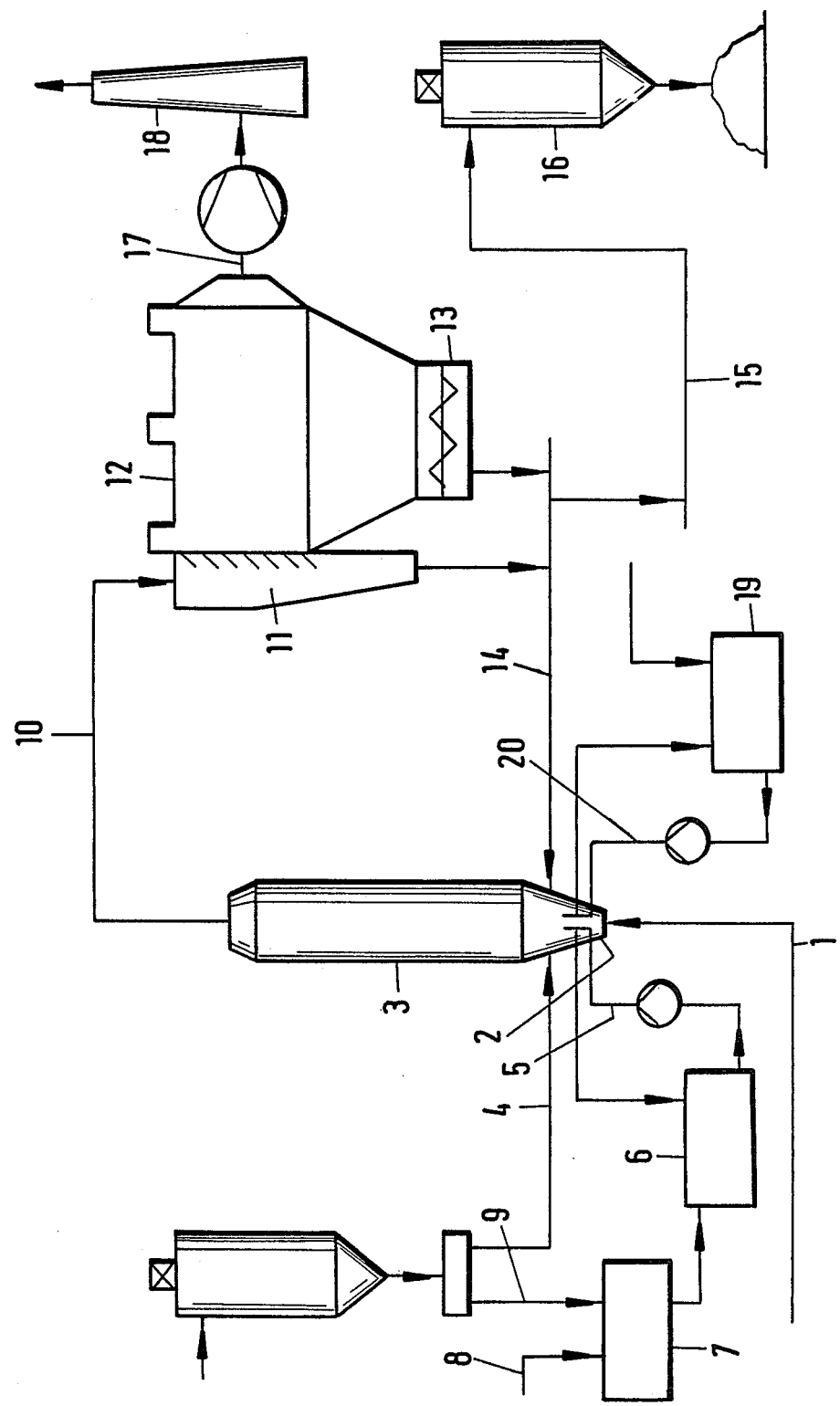

PROCESS OF REMOVING POLLUTANTS FROM FLUE GAS

This application is a continuation, of application Ser. No. 886,805, filed July 16, 1986, now abandoned.

BACKGROUND OF THE INVENTION

This invention relates to a process of removing sulfur oxides and optionally other gaseous pollutants from flue gases by means of a reactant which is contained in a circulating fluidized bed and contains sodium, potassium, calcium and/or magnesium as a cation and oxide, hydroxide and/or carbonate as an anion, wherein a gas velocity between 1 and 10 meters per second (stated as empty-pipe velocity) is maintained in the fluidized bed reactor, a mean suspension density between 0.1 and 100 kg/m$^3$ is maintained in the fluidized bed reactor, the mean particle size of the reactant is between 1 and 300 μm. and the quantity of reactant which is circulated per hour is at least 5 times the quantity of reactant contained in the shaft of the fluidized bed reactor.

The flue gases formed by the combustion of fossil fuels may have substantial sulfur contents, particularly sulfur oxide contents, in dependence on the sulfur content of the starting materials. Garbage incinerators installed in continually increasing numbers also produce flue gases, which contain sulfur oxides and owing to the combustion of plastics, which are virtually always present, contain additional contaminants consisting of hydrogen chloride and hydrogen fluoride. Under the regulations for the protection of the environment, such contaminants must be removed from the gases before they are discharged into the atmosphere.

In most of the processes of purifying flue gases the above-mentioned contaminants are removed by a wet scrubbing of the flue gases, particularly by a treatment with solutions or suspensions of substances which react with the pollutants (Ullmann's Encyclopädie der Techn. Chemie, 3rd edition, Volume 2/2 (1968), page 419).

Other processes involve a dry scrubbing process, in which the gases are passed through a stationary pile of solids which react with the contaminants, and consist, e.g., of activated carbon or brown coal coke. Flue gases may also be purified with the aid of a so-called traveling bed of solids, which are progressively laden as they descend in the reactor and are finally discharged while fresh solids are fed to the reactor in its upper portion at the rate at which solids are discharged (Meier zu Köcker "Beurteilung und Aussichten von Verfahren zur Rauchgasentschwefelung", V.G.B. Kraftwerkstechnik 53 (1973), pages 516 et seq.).

Another known apparatus for a removal of pollutants from flue gases by a dry process succeeds the combustion chamber in the direction of flow of the flue gases and is disposed in a boiler portion in which the flue gases have temperatures from 700 to 900° C. That apparatus comprises a fluidized bed, which completely occupies the flow area for the flue gases, and/or a circulating fluidized bed, which is supplied with sorbent consisting of calcium carbonate and/or magnesium carbonate (Published German Application No. 30 09 366). In that apparatus the gas inlet bottom under the fluidized bed is suitably cooled.

It is also known to remove pollutants from flue gases by means of a circulating fluidized bed in a process which is of the kind described first hereinbefore and in which the flue gas is suitably cooled to prevent a rise of the temperature of the mixture of flue gas and reactant above 150° C. (Published German Application No. 32 35 559).

The main disadvantages of wet purification processes reside in that the sludge obtained, which contains sulfites and sulfates and possibly also chlorides, can be disposed of only with great difficulty and that the purified flue gases must be reheated. The known dry purification processes using a stationary or traveling bed have the disadvantage that the sorbents are coarsegrained so that their capacity for combining with the contaminants contained in the flue gas is utilized only to a very low degree and that very large reactors are required because the permissible gas velocity is relatively low and the rates of gas to be purified are high.

Difficulties involved in the removal of pollutants from flue gases at temperatures between 700° and 900° C. by fluidized bed technology reside in that the grate under the fluidized bed must be made of a highly heat-resisting material or provided with a cooling system, which involves a high process expenditure. Besides, the fresh reactant charged in a cold state extracts sensible heat from the flue gas and that heat is no longer available for the generation of steam. Additional measures must be adopted to maintain the flue gases at a temperature between 700° and 900° C. because the flue gases are usually hotter as they leave the combustion chamber and colder as they leave the waste heat boiler. Existing waste heat systems would require to be structurally altered or reconstructed at costs which cannot be justified economically, and special designs are required for that purpose.

Whereas the process disclosed in Published German Application No. 32 35 559 is based on a proper concept, it has the disadvantage that it does not produce satisfactory results under all operating conditions under which flue gases may have to be purified and/or in that it involves a substantial process expenditure.

It is an object of the invention to provide a process which is free of the disadvantages of the known gas purification processes and which can be carried out in a simple manner and with inexpensive reactants and can easily be adapted to all operating conditions of the combustion equipment by which flue gases are delivered.

SUMMARY OF THE INVENTION

To accomplish that object the process of the kind mentioned first hereinbefore is carried out in accordance with the invention in such a manner that the pollutants are removed from the flue gases when the temperature of the mixture of flue gas and reactant is not in excess of 50° C. above the dew point temperature of water vapor, the reactant is selectively charged at different locations in a dry form, on the one hand, and as an aqueous solution or suspension, on the other hand, and the form in which the reactant is charged is controlled in dependence of the temperature and the SO$_2$ content of the purified gas.

Whereas an orthodox fluidized bed constitutes a dense phase, which is separated by a distinct density step from the fluidized bed of the circulating fluidized bed used within the scope of the invention contains states of distribution having no defined boundary layer. There is no density step between a dense phase and an overlying gas space but the solids concentration in the reactor gradually decreases from bottom to top.

Desirable reactants may consist of calcium oxide and particularly of calcium hydroxide, which has a particularly high reactivity. The calcium hydroxide is preferably produced in a plant for dry-slaking lime, i.e., without an excess of water.

The reactants are charged as dry solids or in the form of aqueous solutions or suspensions. The form in which the reactant is charged will depend on the load of the combustion equipment. During an operation under a base load or a steady load, the flue gas usually has low to moderate $SO_2$ contents and the reactant is usually charged in the form of an aqueous solution or suspension so that the required final $SO_2$ contents can be obtained if the temperature of the mixture of flue gas and reactant is controlled at the same time by a direct injection of water.

If the flue gas has a high $SO_2$ content, as is often the case when low-grade fuels are burnt, additional reactant is supplied in the form of dry solids. In that case the emission of $SO_2$ can be maintained at the intended low value without a change of the charging of the reactant in wet and dry forms. Particularly, in that embodiment of the invention there is no need for an additional, different reactant, e.g., of a reactant which combines with the sulfur oxides to form water-soluble salts, which could be disposed of only with difficulty. That embodiment differs from a charging of only wet reactant also in that a temperature drop below the dew point temperature of water vapor will reliably be avoided.

As the combustion equipment is started up and when the combustion equipment is started and shut down frequently (during peak load operation), the invention calls for a charging of reactant only in a dry form. In that case the pollutants will be removed without a supply of additional energy for heating the initially cold flue gases and a temperature drop below the dew point temperature will be avoided.

If the reactant is charged in an aqueous phase, the solids content usually amounts to 5 to 30 wt.%.

The reactivity of the reactant increases if the temperature of the mixture of flue gas and reactant decreases. For this reason the process in accordance with the invention may be carried out in such a manner that the flue gas is cooled so that the temperature of the mixture of flue gas and reactant is maintained at a temperature that is 3° to 30° C. above the dew point temperature of water vapor.

In the purification of flue gases having substantial contents of nitrogen oxides, the latter can desirably be removed by an addition of agents known per se, such as alkali metal hydroxide, alkali metal carbonate, alkali metal bicarbonate and/or zeolite or of hydrogen peroxide and/or ammonia.

In a preferred embodiment of the invention the fluidized state in the fluidized bed is so controlled that in case of a definition by the Froude and Archimedes number the following ranges are obtained:

$$1 \leq \tfrac{3}{4} \times Fr^2 \times \frac{\rho_g}{\rho_k - \rho_g} \leq 100$$

and
ti $1 \leq Ar \leq 1000$ wherein $$Ar = \frac{d_k^3 \times g(\rho_k - \rho_g)}{\rho_g \times \nu^2}$$

and $$Fr^2 = \frac{u^2}{g \times d_k}$$

In said equations
u = the relative gas velocity in m/sec
Ar = the Archimedes number
Fr = the Froude number
$\rho g$ = the density of the gas in kg/m$^3$
$\rho k$ = the density of the solid particle in kg/m$^3$
$d_k$ = the diameter of the spherical particle in m
$\nu$ = the kinematic viscosity in m$^2$/sec
g = the acceleration due to gravity in m/sec$^2$ The required temperature of the mixture can also be controlled by an injection of water into the fluidized bed reactor.

The gas velocity in the fluidized bed reactor should be selected in dependence on the mean particle size and should lie in the lower range in case of small particles and in the upper range in case of large particles.

The suspension density to be maintained in the fluidized bed reactor may be varied within wide limits. It will be particularly desirable to select suspension densities in the lower range because the pressure loss of the flue gas passing through the fluidized bed will be particularly low in that case. For this reason the mean suspension density in the fluidized bed reactor is maintained between 0.2 and 2 kg/m$^3$ in a preferred embodiment of the invention.

In order to ensure a maximum loading of the reactants with the contaminants contained in the flue gas and a thorough and effective mixing of solids and gas, another preferred feature of the invention resides in that the quantity of reactant circulating per hour is 20 to 150 times the quantity of reactant contained in the shaft of the fluidized bed reactor.

Particularly the loading of the reactant can additionally be improved in that, in accordance with a further preferred feature of the process in accordance with the invention, laden reactant is activated, e.g., by grinding, and is subsequently recycled to the circulating fluidized bed. For instance, the grinding operation produces a new reactive surface area.

The reactant used to remove sulfur oxides and/or other pollutants is preferably charged into the lower portion of the fluidized bed reactor.

Particularly when it is intended to use carbonate reactants, such as lime and/or dolomite, a preferred feature of the invention resides in that at least part of the reactant is charged into the hot flue gas stream within the waste heat boiler portion. This will afford the advantage that carbon dioxide is released at least in part under the action of the sensible heat of the flue gas and a reactant of particularly high activity is thus produced. That step is preferably carried out in that portion of the waste heat boiler in which the temperature is between 600° and 1100° C.

The reactant will have a particularly high reactivity if the water vapor partial pressure of the gas in the fluidized bed reactor is as high as possible, i.e., if the flue gas is purified at a temperature which is slightly (about 3° C.) in excess of the dew point temperature of water vapor.

The fluidized bed reactor used to purify flue gases may be rectangular, square or circular in cross-section. The gas distributor may consist of a grate, which is formed with nozzles. Particularly in reactors which are large in cross-section and flown through by gases at high rates, however, the lower portion of the fluidized bed reactor will desirably be conical and the flue gas will be charged into the reactor through a venturilike nozzle. The last-mentioned design will be desirable because it involves a particularly low pressure drop and because it is not susceptible to being soiled and to wear.

The reactant can be charged into the fluidized bed reactor by conventional means, desirably through one or more lances for charging dry reactant, e.g., by pneumatic blowing, and through nozzles connected to a return line if the reactant is charged in an aqueous phase. Because an effective transverse mixing is effected in circulating fluidized beds, a relatively small number of charging lances and nozzles will be sufficient.

The flue gas can be purified under pressures which can be selected within a wide range, e.g., up to about 25 bars. A superatmospheric pressure will be required particularly if the combustion is also effected under a superatmospheric pressure. During a sorption under pressure it must be taken into account that the gas velocity in the fluidized bed reactor must be decreased toward the lower limit stated as the pressure increases. But the flue gas will generally be purified under a pressure of about 1 bar.

The circulating fluidized bed can be formed by means of a fluidized bed reactor, a cyclone separator or a different mechanical separator, and a return line leading to the lower portion of the fluidized bed reactor. In that case the gas stream leaving the cyclone separator is subjected to a fine purification, e.g., by means of an electrostatic precipitator.

It will be particularly suitable to provide an electrostatic precipitator, which directly succeeds the fluidized bed reactor and serves to collect the solids entrained by the gases leaving the fluidized bed reactor. In that case the pressure drop in the gas will be further reduced. If the electrostatic precipitator consists of a plurality of stages, the solids entrained by the gases may be fractionated by particle size and by composition and, e.g, the fines can be removed from the process when they have a high loading, whereas the coarse fraction or fractions can be recirculated to the fluidized bed reactor to form the circulating fluidized bed and may optionally be reactivated before.

The process in accordance with the invention can be used to purify the entire flue gas produced by a combustion process. In dependence on requirements imposed by public authorities in a given case, a partial stream of the flue gas may be purified and in a mixture with the non-purified partial stream may be supplied to the chimney. The purification may also be combined with wet scrubbing processes.

For the purposes of the invention the term flue gases covers the flue gases from power plants, from furnaces burning fossil fuels, from garbage incinerators, from sludge incinerators and the like, provided that such combustion equipment is operated with an excess of oxygen or with oxygen supplied at a stoichiometric rate.

The advantages afforded by the process in accordance with the invention reside in that the process can be carried out behind existing combustion plants without a need for an alteration of the existing heat exchange means and that the process can be combined with any other processes of purifying gas in case of need. No treatment is required after the purification of gas and the flue gas can be purified at very high throughput rates per unit of area of the fluidized bed reactor. Because the reactant which is circulated in the circulating fluidized bed has a substantial buffer action, a reliable purification of the gas will be ensured without a high expenditure for controlling the reactant supply rate even when the sulfur dioxide content of the flue gas exhibits strong fluctuations.

A further important advantage resides in that the process in accordance with the invention can be adapted in a very simple manner to any operating condition of the preceding combustion plant. A change of the load condition will not require the use of a different reactant. Additional measures such as a heating of the flue gases under certain load conditions or a reheating of the purified gases, are not required. The temporary occurrence of high emission values is reliably precluded. Even extremely high $SO_2$ contents in the flue gas can reliably be decreased below the required limit without a need for additional equipment and additional materials.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The drawing schematically depicts a flow scheme of the process in accordance with the invention.

DESCRIPTION OF PREFERRED EMBODIMENT

The flue gas to be purified is supplied through a line 1 and is charged into the conical lower portion 2 of the fluidized bed reactor 3, which in that lower portion is provided with a venturilike nozzle. Dry calcium oxide is charged through line 4 and calcium hydroxide in an aqueous phase is charged through line 5.

The calcium hydroxide in an aqueous phase comes from a supply tank 6 and is supplied to the latter from a slaking tank 7, which is connected to a water supply line 8 and a line 9 for supplying dry calcium oxide.

A solids-gas suspension is formed in the fluidized bed reactor 3 and leaves the latter through line 10 and then enters the electrostatic precipitator 12, which is provided with a preliminary separator 11. Solids are collected in the preliminary separator 11 and in the dust bin 13 and are recycled to the fluidized bed reactor 3 in line 14 and can be removed from the process in line 15 leading to a bin 16.

The purified flue gas flows in line 17 to a chimney 18.

A water tank 19 is provided for supplying water to the fluidized bed reactor 3 through line 20 in case of need, independently of the charging of reactant.

EXAMPLE

The flue gas to be purified was produced by a furnace for burning brown coal. The flue gas was produced at a rate of 640,000 sm$^3$/h and contained:
12500 mg/sm$^3$ $SO_2$;
200 mg/sm$^3$ HCl; and 13000 mg/cm³ fly ash.

The fluidized bed reactor used has a cylindrical portion which was 8.5 meters in diameter and had a height of 20 m.

The flue gas was supplied to the fluidized bed reactor 3 through line 1 and the venturilike lower portion 2. Dry calcium oxide having a mean particle size of 7.5 μm was supplied throug line 4 at a rate of 3810 kg/h. Additional calcium oxide at a rate of 7630 kg/h was supplied through line 5 as an aqueous suspension which contained about 20% solids and was charged under an atomizing pressure of 38 bars. In the fluidized bed reactor 3, the gas velocity amounted to about 5 meters/sec (stated as the empty-pipe velocity) and the mean suspension density to about 1 kg/m³. The mixture of flue gas and of solids contained in the circulating fluidized bed had a temperature of 70° C.

The temperature was controlled by a direct injection of water from nozzles, which were supplied through line 20 and connected to a return line. The solids-gas suspension leaving the fluidized bed reactor 3 at its top through line 10 had a suspension density of 600 g/sm³ and was supplied through the preliminary separator 11 to the two-stage electrostatic precipitator 12. Solids at a total rate of 384,000 kg per hour were collected in the preliminary separator 11 and in the dust bin 13. Collected solids were recycled at a rate of about 357000 kg/h in line 14 to the lower portion of the fluidized bed reactor 3 and were removed from the process at a rate of about 27000 kg/h through line 15. The solids substantially consisted of a mixture of calcium sulfite, calcium chloride, calcium sulfate, unreacted calcium hydroxide and fine dust.

The exhaust gas withdrawn through line 17 contained:
400 mg/sm³ $SO_2$;
<10 mg/sm³ HCl; and
10 mg/cm³ dust.
This means that 97% sulfur dioxide was removed if calcium hydroxide was supplied at 1.3 times the stoichiometric rate relative to the $SO_2$ contained in the flue gas.

During a start-up operation lasting about 4 to 6 hours, a desulfurization is effected only by an addition of dry calcium oxide. When a minimum temperature of about 90° C. has been reached, additional reactant is added in an aqueous phase and the rate at which calcium oxide is supplied is correspondingly reduced.

When the operation of the power plant had to be changed from base load duty involving a firing of brown coal to peak load duty and medium-load duty involving a firing of pit coal, the following flue gas data were obtained:

| | |
|---|---|
| Gas rate | 480000 sm³/h; |
| $SO_2$ | 2500 mg/sm³; |
| Fly dust | 4000 mg/sm³. |

That altered operation does not require a basic alteration but only a gradual alteration of the operating conditions. The mode of operation described hereinbefore is adapted as follows for that purpose:

Dry calcium hydroxide having a mean particle size of 3.5 μm was supplied to the fluidized bed reactor 3 through line 4 at a rate of 1870 kg/h.

In the fluidized bed reactor 1 the gas velocity amounted to about 3.8 meters per second (stated as empty-pipe velocity) and the mean suspension density amounted to about 1 kg/m³. The temperature of the mixture of flue gas and solids contained in the circulating fluidized bed amounted to 70° C. and the temperature was controlled by a supply of water through line 20 and nozzles provided with return lines.

The solids-gas suspension leaving the fluidized bed reactor 3 at its top through line 10 had a suspension density of 600 g/sm³ and through the preliminary separator 11 entered the two-stage electrostatic precipitator 12. Solids at a total rate of 288000 kg/h were collected in the preliminary separator 11 and the dust bin 13. Collected solids at a rate of 284000 kg/h were recycled through line 14 to the lower portion of the fluidized bed reactor 3. Collected solids at a rate of about 4000 kg/h were discharged through line 15. Said collected solids consisted substantially of a mixture of calcium sulfite, calcium chloride, calcium sulfate, unreacted calcium hydroxide and fly dust.

The purified gas withdrawn through line 17 contained:
100 mg/sm³ $SO_2$;
<10 mg/sm³ HCl; and
40 mg/sm³ dust.

This means that 96% sulfur dioxide was removed if calcium hydroxide was supplied at 1.3 times the stoichiometric rate relative to the $SO_2$ contained in the flue gas.

It will be understood that the specification and examples are illustrative but not limitative of the present invention and that other embodiments within the spirit and scope of the invention will suggest themselves to those skilled in the art.

I claim:

1. A process for removing sulfur oxides from a flue gas in a circulating fluidized bed system comprising:
   introducing the flue gas into a circulating fluidized bed reactor and maintaining a gas velocity therein of from 1 to 10 meters per second started as empty pipe velocity;
   selectively charging reactant into the reactor at different locations in a dry form and as an aqueous solution or suspension, the form in which the reactant is charged being controlled in dependence on the temperature and the $SO_2$ content of hte purified gas, said reactant containing at least one substance selected from the group consisting of $Na_2O$, NaOH, $Na_2CO_3$, $K_2O$, KOH, $K_2CO_3$, CaO, Ca(OH)$_2$, $CaCO_3$, MgO, Mg(OH)$_2$, $MgCO_3$, and mixtures thereof, said reactant having a mean particle size of from 1 to 300 microns;
   removing the pollutants from the flue gases at a temperature of the mixture of flue gas and reactant not in excess of 50° C. above the dew point temperature of water vapor;
   maintaining a mean suspension density of from 0.1 to 100 kg/m³ in said reactor;
   circulating in the circulating fluidized bed system a quantity of reactant per hour which is at least five (5) times the quantity of reactant contained in the shaft of the fluidized bed reactor; and
   withdrawing a partial stream of laden reactant from the fluidized bed;
   activating said withdrawn laden reactant; and returning the activated sorbent to the circulating fluidized bed.

2. The process of claim 1, wherein the reactant is charged in an aqueous phase which has a solids content of 5 to 30 wt. %.

3. The process of claim 1, wherein the flue gas is cooled so that the temperature of the mixture of flue gas and reactant is maintained at a temperature that is 3° to 30° C. above the dew point temperature of water vapor.

4. The process of claim 1, wherein the circulating fluidized bed is operated under the following conditions defined by the Archimedes and Froude numbers:

$$1 \leq \tfrac{3}{4} \times Fr^2 \times \frac{\rho_g}{\rho_k - \rho_g} \leq 100$$

and $$1 \leq Ar \leq 1000.$$

5. The process of claim 1, wherein the mean suspension density in the fluidized bed reactor is maintained between 0.2 and 2 kg/m$^3$.

6. The process of claim 1, wherein the quantity of reactant circulating per hour is 20 to 150 times the quantity of reactant contained in the shaft fluidized bed reactor.

7. The process of claim 1, wherein the partial stream of laden reactant withdrawn from the circulating fluidized bed is activated by grinding.

8. The process of claim 1, wherein at least part of the reactant is charged into the hot flue gas stream within the waste heat boiler portion.

* * * * *